(12) United States Patent
Krishnamoorthy

(10) Patent No.: US 11,025,193 B2
(45) Date of Patent: Jun. 1, 2021

(54) COMPACT, LOW-PROFILE, MULTIPLY CONFIGURABLE SOLAR PHOTOVOLTAIC MODULE WITH CONCEALED CONNECTORS

(71) Applicant: HELION CONCEPTS, INC., San Jose, CA (US)

(72) Inventor: Sudarshan Krishnamoorthy, San Jose, CA (US)

(73) Assignee: HELION CONCEPTS, INC., San Jose, CA (US)

( * ) Notice: Subject to any disclaimer, the term of this patent is extended or adjusted under 35 U.S.C. 154(b) by 294 days.

(21) Appl. No.: 15/678,689

(22) Filed: Aug. 16, 2017

(65) Prior Publication Data

US 2018/0054160 A1   Feb. 22, 2018

Related U.S. Application Data

(60) Provisional application No. 62/375,570, filed on Aug. 16, 2016.

(51) Int. Cl.
*H02S 40/34* (2014.01)
*H02S 40/36* (2014.01)
(Continued)

(52) U.S. Cl.
CPC ............ *H02S 40/34* (2014.12); *H02S 20/22* (2014.12); *H02S 30/10* (2014.12); *H02S 40/36* (2014.12);
(Continued)

(58) Field of Classification Search
CPC ........... H01L 31/02016; H01L 31/0201; H01L 31/00504; H02S 40/34; H02S 40/36;
(Continued)

(56) References Cited

U.S. PATENT DOCUMENTS 3,603,915 A   9/1971 Jayne et al.
4,582,953 A   4/1986 Nagase et al.
(Continued)

FOREIGN PATENT DOCUMENTS

JP   2001068184 A   3/2001
JP   2003317830 A   11/2003
(Continued)

OTHER PUBLICATIONS

International Search Report and Written Opinion dated Dec. 23, 2015 for International Application No. PCT/US2015/050378.

*Primary Examiner* — Magali P Slawski
*Assistant Examiner* — Kourtney R S Carlson
(74) *Attorney, Agent, or Firm* — Seager, Tufte & Wickhem LLP

(57) ABSTRACT

A solar module comprising a substrate, a honeycomb structure on the substrate, a solar panel on the honeycomb structure, such that the substrate, honeycomb and solar panel form a sandwich having an exterior perimeter, a rotary junction box configured to be manipulated through the substrate between at least first and second electrical configurations, a plurality of electrical couplers along the exterior perimeter, and a plurality of electrical connectors connecting the solar panel, the rotary junction box, and the electrical couplers; wherein the honeycomb structure defines one or more channels and a pocket, the channels facilitating the electrical connectors and the pocket receiving the rotary junction box.

17 Claims, 9 Drawing Sheets

(51) Int. Cl.
  *H02S 40/42* (2014.01)
  *H02S 20/22* (2014.01)
  *H02S 30/10* (2014.01)
  *H02S 20/23* (2014.01)

(52) U.S. Cl.
  CPC .............. *H02S 40/42* (2014.12); *H02S 20/23* (2014.12); *Y02B 10/10* (2013.01)

(58) Field of Classification Search
  CPC .......... H02S 40/42; H02S 20/22; H02S 20/23; H02S 30/10; H02N 6/00; Y02B 10/10
  USPC .................................................. 136/242–265
  See application file for complete search history.

(56) References Cited

U.S. PATENT DOCUMENTS

| | | | |
|---|---|---|---|
| 4,931,021 A | 6/1990 | Mohan | |
| 4,979,903 A | 12/1990 | Gosselin | |
| 5,108,295 A | 4/1992 | Koike et al. | |
| 5,411,402 A | 5/1995 | Bethurum | |
| 6,030,231 A | 2/2000 | Sarkiniemi | |
| 6,062,911 A | 5/2000 | Davis et al. | |
| 6,102,734 A | 8/2000 | Kuo | |
| 6,268,559 B1 * | 7/2001 | Yamawaki | G05F 1/62 136/243 |
| 7,285,719 B2 | 10/2007 | Conger | |
| 7,320,606 B2 | 1/2008 | Midorikawa | |
| 7,390,961 B2 | 6/2008 | Aschenbrenner et al. | |
| 7,710,740 B2 | 5/2010 | Liu | |
| 7,802,994 B1 | 9/2010 | Chen et al. | |
| 7,804,022 B2 | 9/2010 | De Ceuster | |
| 8,016,007 B2 | 9/2011 | Ashjaee et al. | |
| 8,148,627 B2 | 4/2012 | Rose et al. | |
| 8,272,897 B1 | 9/2012 | Lin | |
| 8,282,403 B2 | 10/2012 | Sawai | |
| 8,475,184 B2 | 7/2013 | Hasegawa | |
| 8,684,752 B2 | 4/2014 | Hsueh | |
| 8,727,813 B2 | 5/2014 | Yang et al. | |
| 8,740,642 B2 | 6/2014 | Keenihan et al. | |
| 8,821,178 B2 | 9/2014 | Fukui et al. | |
| 8,998,660 B2 | 4/2015 | Bakos | |
| 9,095,069 B2 | 7/2015 | Stefanoff et al. | |
| 9,136,655 B2 | 9/2015 | Moon et al. | |
| 9,166,327 B2 | 10/2015 | Yu | |
| 2002/0080590 A1 | 6/2002 | Bauermeister | |
| 2002/0094708 A1 | 7/2002 | Budman et al. | |
| 2006/0067064 A1 | 3/2006 | Crews et al. | |
| 2007/0074755 A1 * | 4/2007 | Eberspacher | H01L 31/02008 136/244 |
| 2008/0144301 A1 | 6/2008 | Konishi | |
| 2008/0149170 A1 | 6/2008 | Hanoka | |
| 2008/0187700 A1 | 8/2008 | Smith et al. | |
| 2008/0318478 A1 | 12/2008 | Nelson et al. | |
| 2010/0154327 A1 | 6/2010 | Reyal et al. | |
| 2010/0275976 A1 | 11/2010 | Rubin et al. | |
| 2011/0088741 A1 * | 4/2011 | Dunton | H03K 17/691 136/244 |
| 2011/0100436 A1 | 5/2011 | Cleereman et al. | |
| 2011/0168230 A1 | 7/2011 | Buller et al. | |
| 2011/0192448 A1 | 8/2011 | Croft et al. | |
| 2011/0220180 A1 | 9/2011 | Cinnamon et al. | |
| 2012/0006483 A1 | 1/2012 | Hanoka et al. | |
| 2012/0013191 A1 | 1/2012 | Jeanbeaud | |
| 2012/0073623 A1 | 3/2012 | Jones et al. | |
| 2012/0085040 A1 | 4/2012 | Ketwitz, Jr. | |
| 2012/0181973 A1 | 7/2012 | Lyden | |
| 2012/0208397 A1 * | 8/2012 | Schwarze | H01R 29/00 439/534 |
| 2013/0130534 A1 | 5/2013 | Ohkuma | |
| 2013/0252472 A1 | 9/2013 | Watanabe et al. | |

FOREIGN PATENT DOCUMENTS

| | | |
|---|---|---|
| JP | 2007019140 A | 1/2007 |
| KR | 20000033782 A | 6/2000 |
| KR | 20080061779 A | 7/2008 |

* cited by examiner

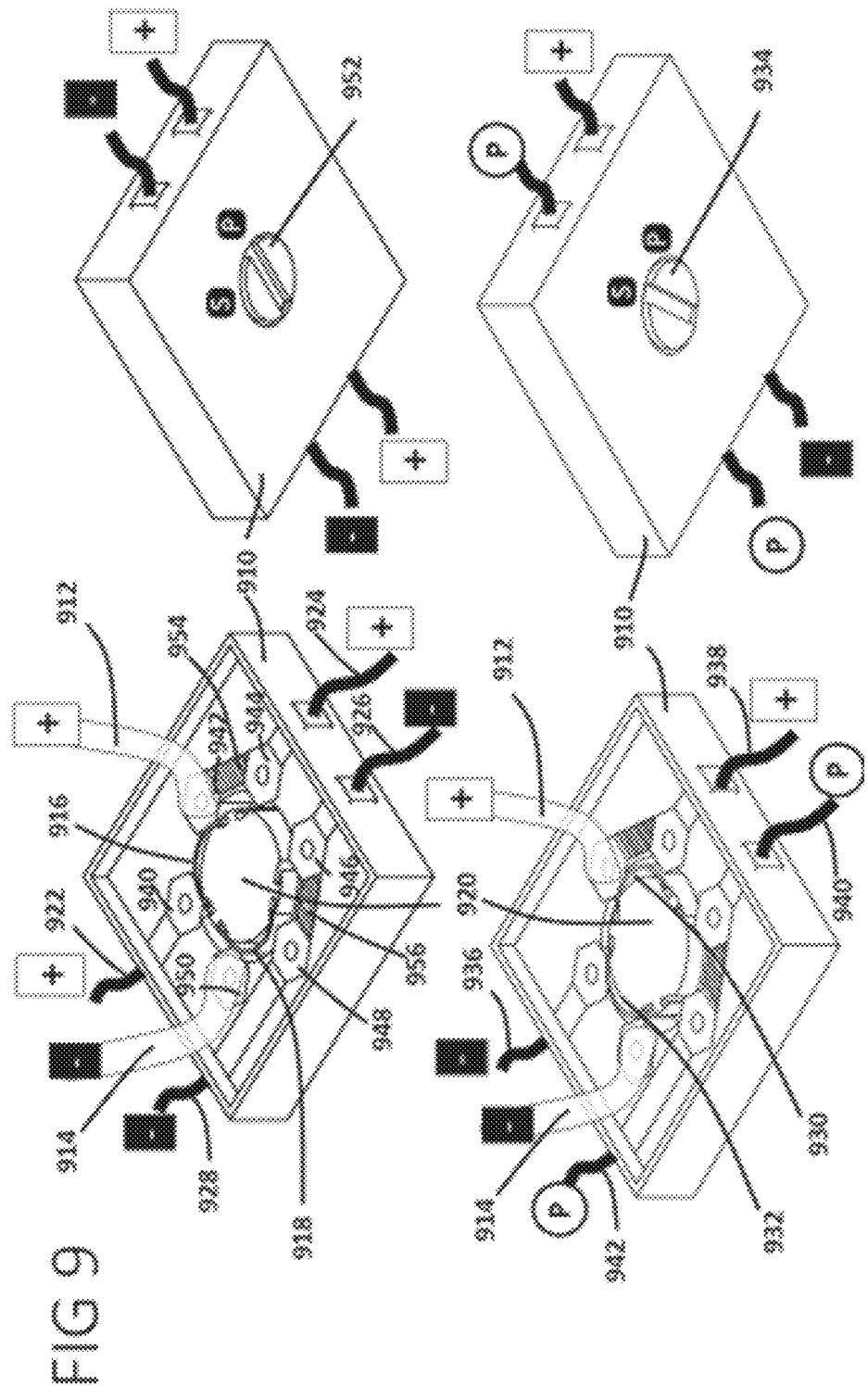

COMPACT, LOW-PROFILE, MULTIPLY CONFIGURABLE SOLAR PHOTOVOLTAIC MODULE WITH CONCEALED CONNECTORS

CROSS REFERENCE TO RELATED APPLICATIONS

The present application claims the benefit of and priority to U.S. Provisional Patent Application Ser. No. 62/375,570, filed Aug. 16, 2016, and titled COMPACT, LOW-PROFILE, MULTIPLY CONFIGURABLE SOLAR PHOTOVOLTAIC MODULE WITH CONCEALED CONNECTORS, the disclosure of which is incorporated herein by reference.

TECHNICAL FIELD AND INDUSTRIAL APPLICABILITY

The present invention relates to the technical field of solar energy conversion devices. More particularly this invention relates to a method of solar photovoltaic module construction and interconnection.

BACKGROUND

Present day glass solar photovoltaic panels are heavy and unwieldy and they need special mounting structures to attach them to rooftops. Limitations of existing design make many other surfaces around residential buildings unsuitable for solar panel installation. The heavy panels are also difficult to transport adding to the cost of solar systems, and the bulky frame needs unsightly mounting structures to be placed on rooftops. Many existing solar panels are configured for series connections and not configured for connection in a parallel configuration. If such panels are to be connected in parallel they need additional cables and connectors which adds to the time and difficulty in setup.

SUMMARY OF THE INVENTION

The present invention, in illustrative examples that follow, proposes a novel combination of light weight substrate, concealed wiring, concealed power connectors and an integrated junction box to make a compact and user configurable solar PV module. A novel junction box described in this invention enables the compact solar modules to be connected in series or parallel configuration by just turning a rotary dial underneath the panel.

BRIEF DESCRIPTION OF THE DRAWINGS

FIG. 9 shows the different switching positions of the junction box for series and parallel configuration of the compact solar PV module.

DETAILED SPECIFICATION

Figure 1:
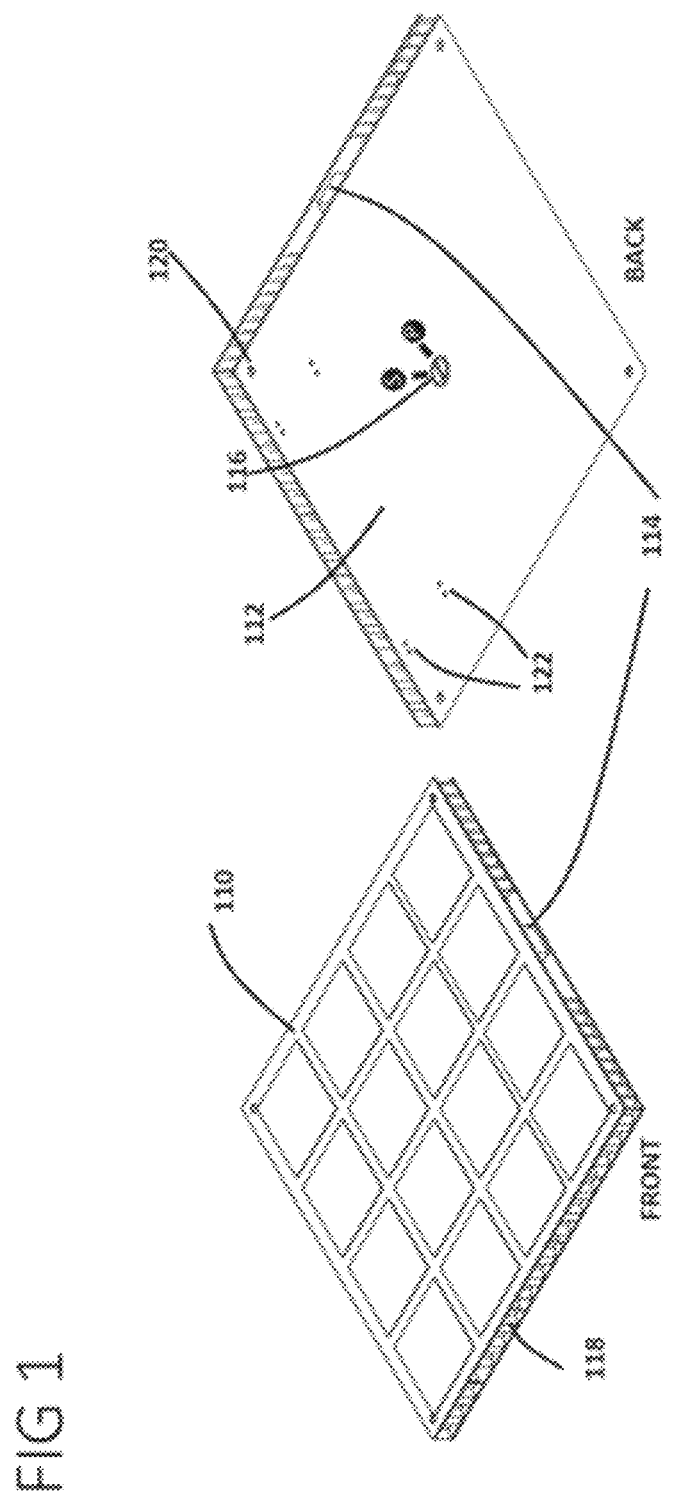
FIG. 1 shows the complete view on the front and the back of the compact solar module.

Referring now to the drawings which show non-limiting examples of the invention in more detail, FIG. 1 shows the front and back view of a compact solar module. The modules can be made of various materials such as plastic and metal, but for enhanced thermal operation of the solar module a thermally conducting metal such as Aluminum may be preferred. The front of the panel [110] comprises of solar cells laid on an appropriate substrate such as a plastic or metal sheet, encapsulated in glass using EVA as encapsulant or non-glass encapsulants such as EVA and Fluoropolymer films which provide protection for various kinds of solar cells, such as monocrystalline silicon solar cells, from atmospheric degradation and at the same time providing optimal light transmission. This layer of encapsulated solar cells is supported by a light weight substrate [118] described in the subsequent sections of this invention.

The back of the compact solar module [112] features a mounting holes [120] near the corners and holes [122] to secure specialized mounting accessories to the compact solar modules with screws. The back side also features a rotary dial [116] that can be turned to point to S or P marked on the back side to configure the panel to work in a series configuration or a parallel configuration respectively. This rotary dial controls the functionality of a slim profile junction box described in subsequent sections. The connectors [114] on the side may be used to connect two panels with each other and to connect one or a collection of such connected panels to electrical loads.

Figure 2:
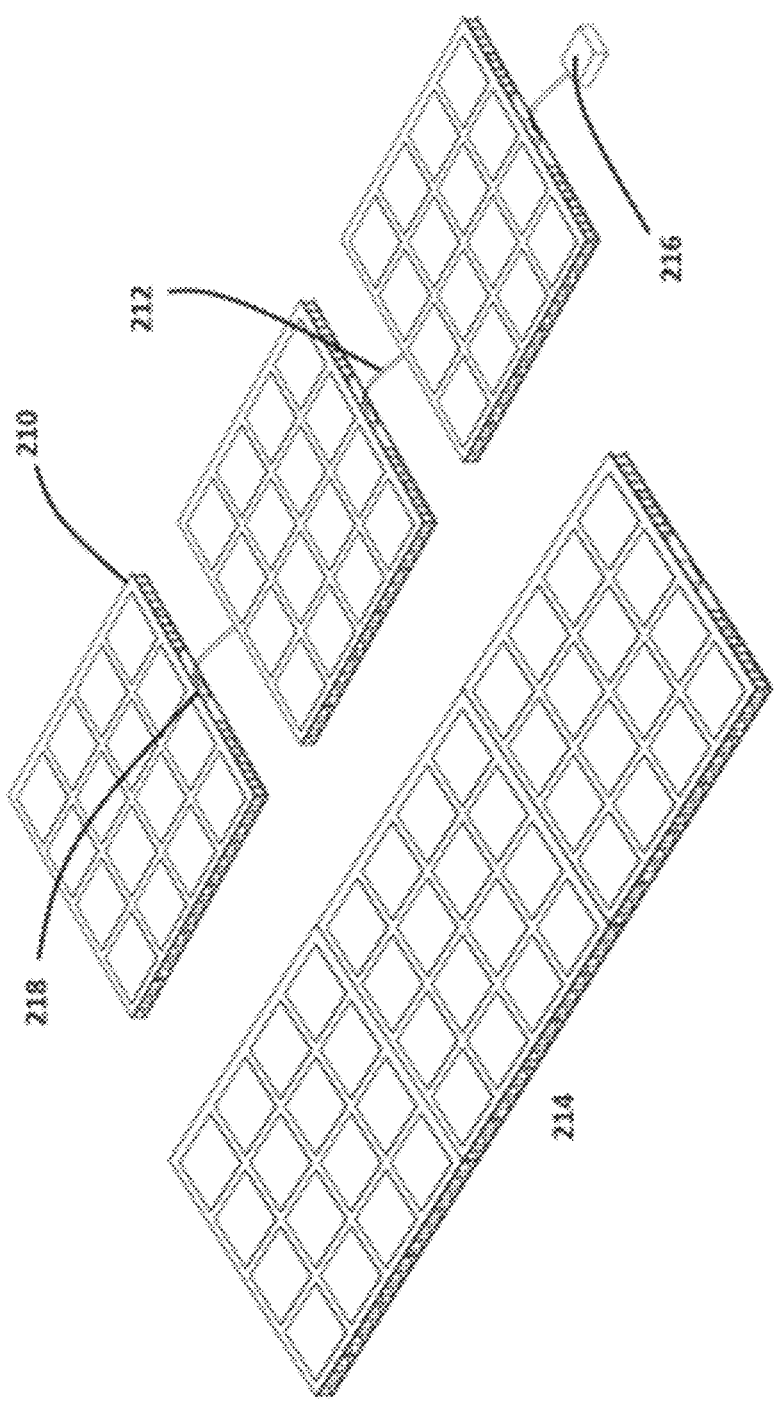
FIG. 2 shows the connection between multiple panels.

FIG. 2 shows another illustration including placement and interconnection of the aforementioned compact solar modules [210] next to each other. The connectors [218] are designed for proper mating with each other to connect appropriate polarities of the DC voltage supplied by the compact solar modules. The modules can be connected to each other with these built in connectors allowing them to be placed in close proximity to each other [214]. Alternatively, interconnections may be had using special extension cables [212] to enable placement at a distance. The concealed flexible wires connected to the connectors [218] can be made retractable with springs or elastic attachment to keep the connectors retracted inside the modules before and after the connections. The panels will usually need to be terminated by an extension connector that connects a collection of compact solar modules to an electrical load.

Figure 3:
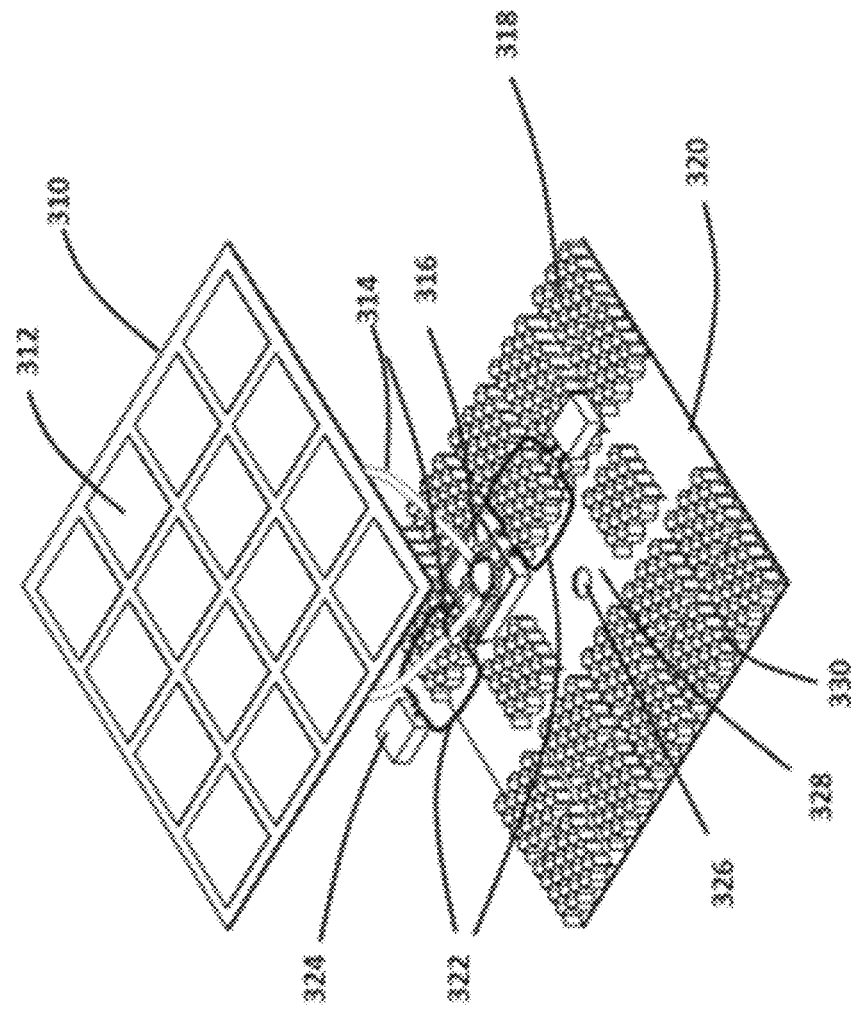
FIG. 3 shows an exploded view of the compact solar module with various internal components displayed.

The lightweight and compact panel includes a honeycomb support material [318], which may be a metal or rigid polymer, placed in specific locations between the top solar cell layer [310] that contains laminated solar cells [312] and appropriate bottom substrate [320] which can be made of various material including but not limited to metal, plastics or fiberglass, as shown in FIG. 3. These honeycomb structures can be attached to the top and bottom layers with the help of special high temperature glues available in the market. With metal top and bottom layers and metal honeycomb structures, other methods of attachment such as spot welding, ultrasonic welding or soldering can also be used. The honeycomb structures are optimally hexagonal in cross-section but are not limited to that shape. They can have, among other shapes, a square or circular cross-section. They can also have slits or perforations to allow air or fluid flow to aid in heat dissipation of the compact solar modules.

Figure 6:
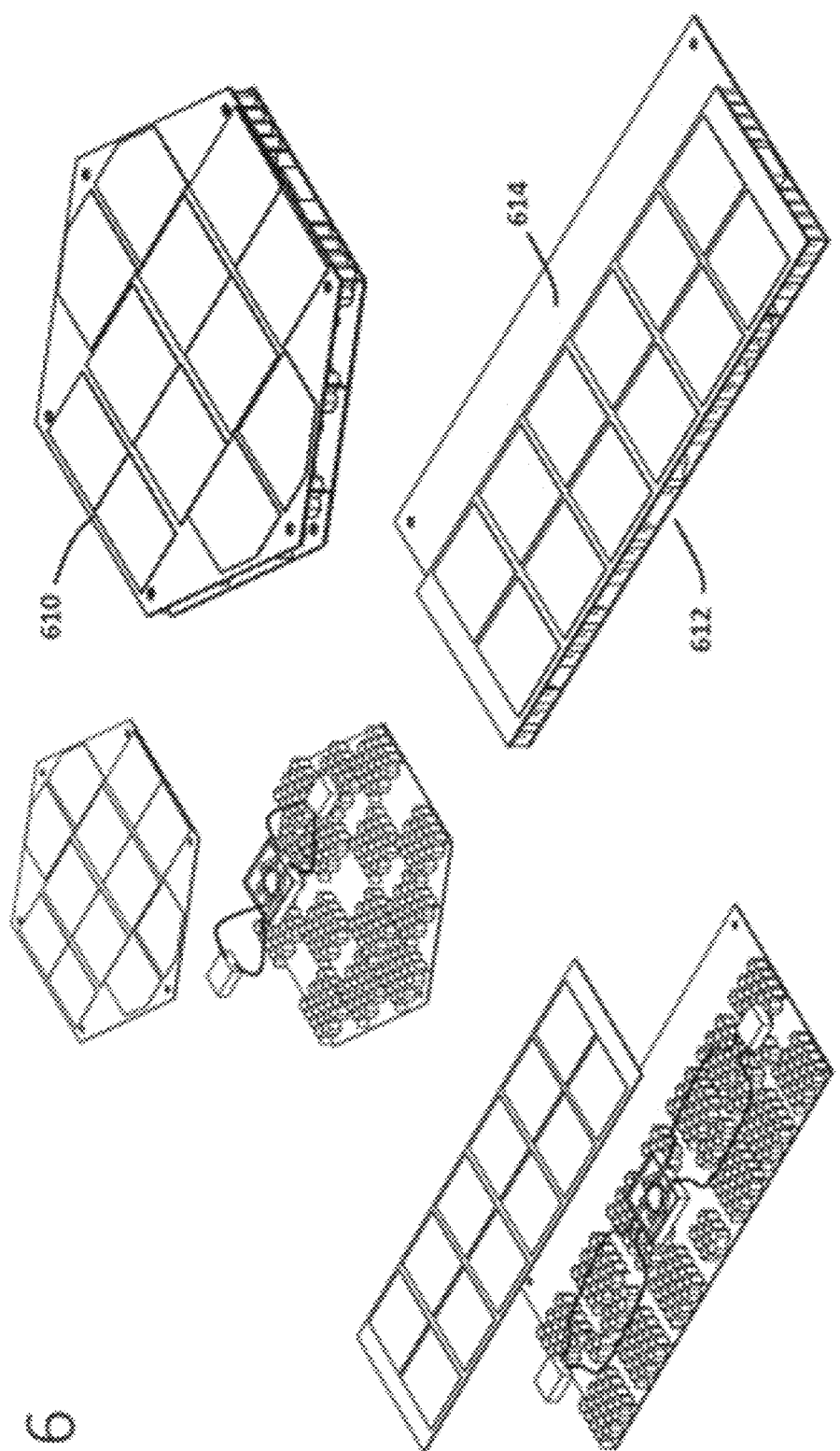
FIG. 6 shows various geometric configurations of the compact solar module.

By careful placement of the these honeycomb structures, channels [330] and pockets [328] can be formed in between the top solar layer and the bottom substrate to accommodate a junction box [316], cables [322] for transmission of power from the junction box and power connectors [324] that enable connection to other compact modules or to external load. The power to the junction box from the top solar panel layer is delivered through DC wires [314] connected to appropriate terminals on the junction box. The hole [326] in the center of the bottom substrate layer accommodate the rotary dial of the selector switch that is an integral part of the junction box described in later sections. The presence of the channels [330] may aid in providing cooling ventilation as air heated by the solar panel, which will warm when in the sun, moves via convection within the structure, sucking in atmospheric, cooler air on one end and expelling heated air the other end. This passive convection cooling may be helpful to avoid damage to the solar cells in extreme conditions and may further aid in avoiding heating in hot spots (such as near the center) that can generate strain on the device. As may be appreciated from FIG. 3 (and also FIGS. 4 and 6) the channels [330] may be open at the periphery of the structure to allow airflow therethrough. In the illustrative embodiment shown, the channels [330] are generally straight, however, in other examples, the channels may be curved or zig-zag to facilitate air flow from the front to the back of the panel or from left to right.

Figure 4:
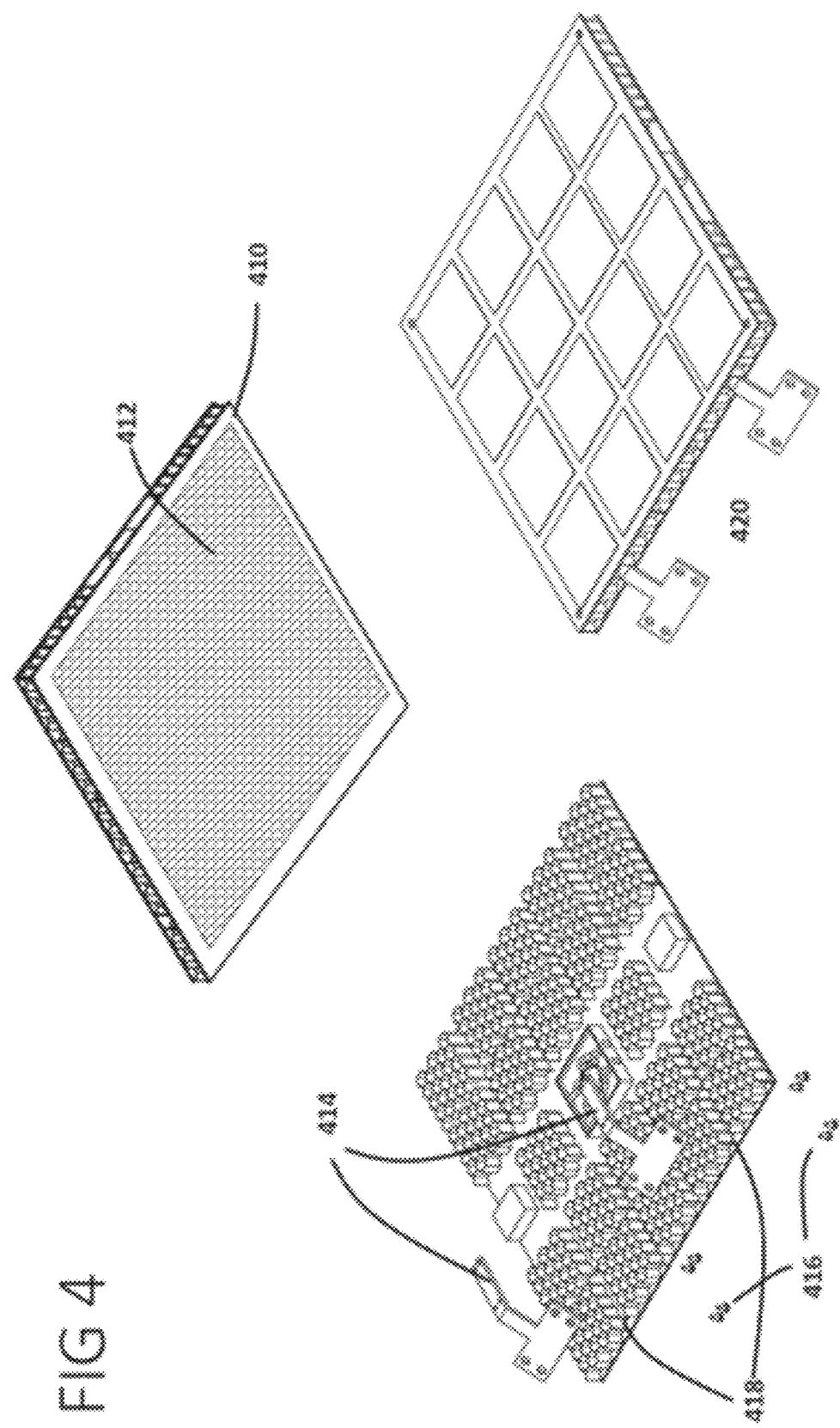
FIG. 4 shows various mounting accessories that can be used to mount the compact solar module to various surfaces.

FIG. 4 show possible addition of accessories to help mount and fix the compact solar modules [410] to a variety of sunlit surfaces. A simplest method of affixing the compact module to a variety of surfaces is with the help of a glue [412] on the back of the compact module. The glue can be covered with a waxed paper to prevent deployment of the glue before actual installation. The channels [418] inside the compact solar module can also be engineered to accommodate angled metal brackets [414] that can be secured to special holes in the bottom layer with screws [416]. That is, the holes for use in attaching the brackets [414] may correspond to one or more channels [418].

Figure 5:
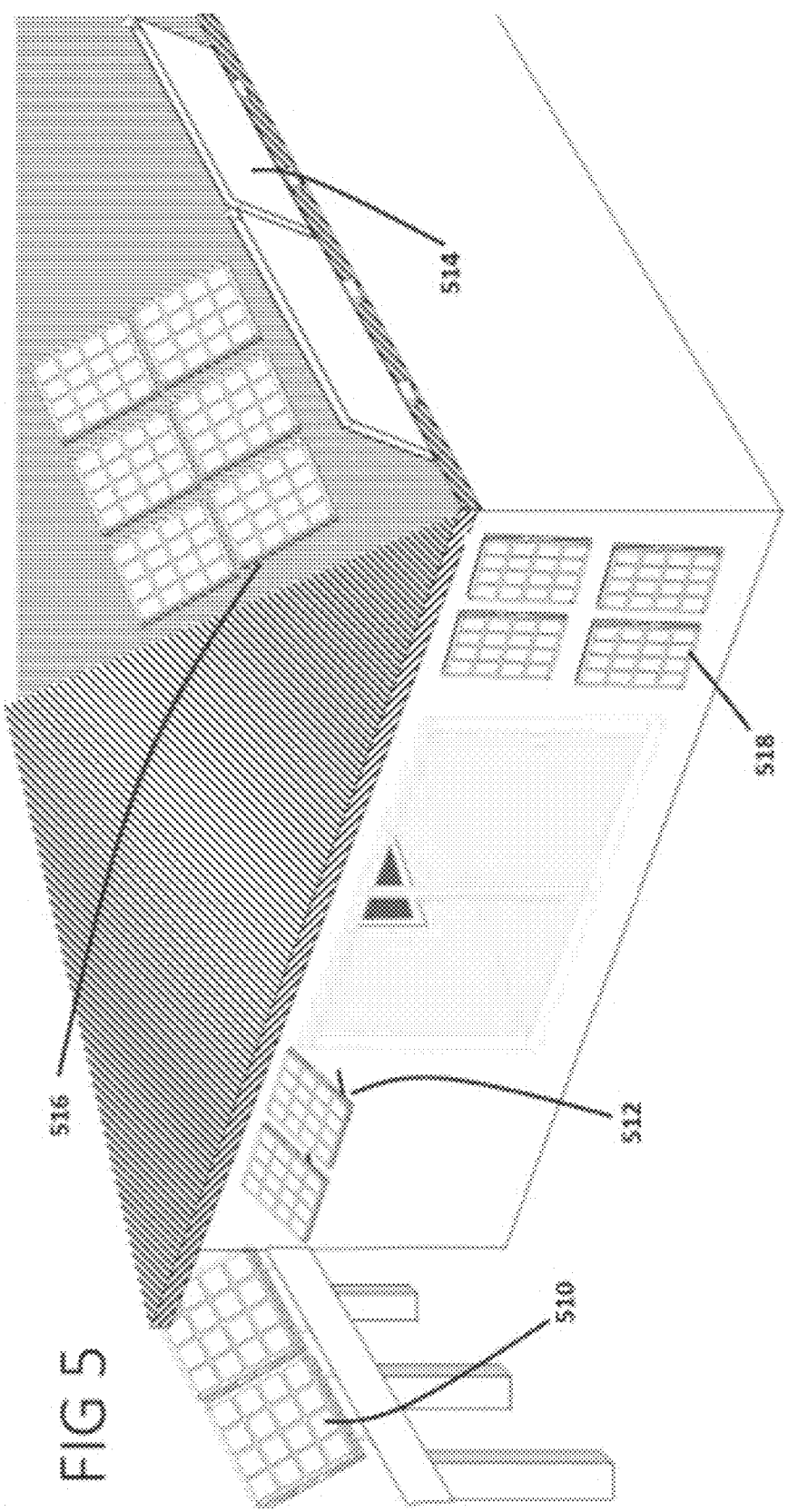
FIG. 5 shows different ways in which one can mount the compact solar module.

As can be seen in more detail in FIG. 5, the compact solar module with built-in angled brackets [420] can be attached to a multitude of structures such as walls [512], siding [514] and fences [510] with the help of screws. The glued surface can be used to attach the compact solar module to walls [518] or rooftops [516]. Glue can eliminate the need for using nails or special mounting structure that penetrate the exterior of the house.

The compact solar modules are not limited to a square shape. In more detail, referring to FIG. 6, there are shown two compact solar modules with a hexagonal profile [610] and an elongated rectangular profile [612]. The internal construction of the modules still require proper placement of the honeycomb supporting structures between the top and bottom plates to create a stiff substrate and channels and pockets necessary to accommodate a junction box, power cables and connectors.

Figure 7:
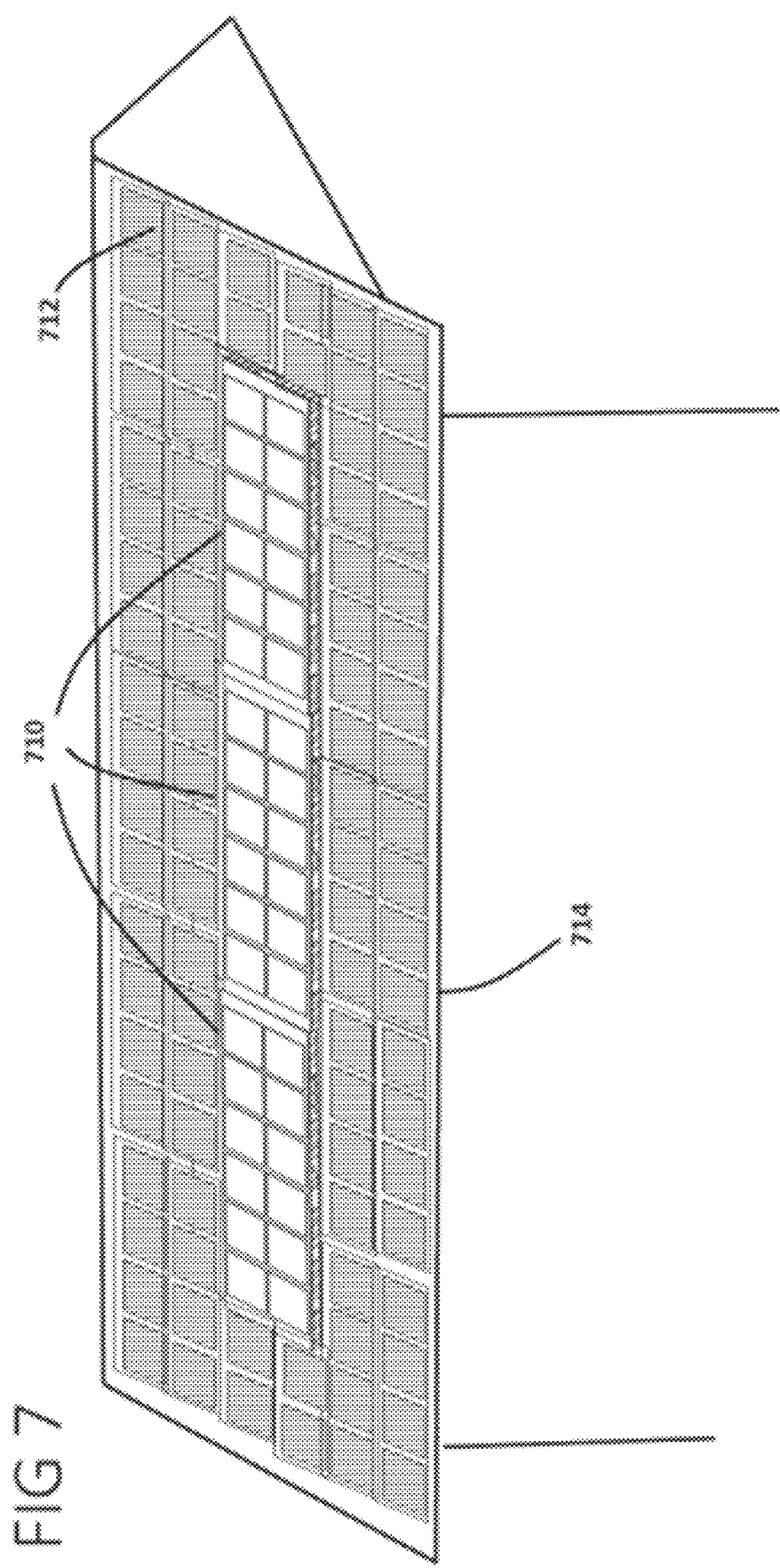
FIG. 7 shows another possible way to mount a rectangular compact module on to an existing roof.

The bottom plate [613] in many occasions can be extended beyond the main body of the compact solar module structure to create an overhang that can go under rooftop shingle [712] as can be seen in the details shown in FIG. 7. Such an installation of the compact solar modules can help create a more seamless integration with the rooftop without the need for additional mounting structures that the traditional solar modules need. The low profile of these compact modules can help tolerate high wind speeds without experiencing a lift-off.

Figure 8:
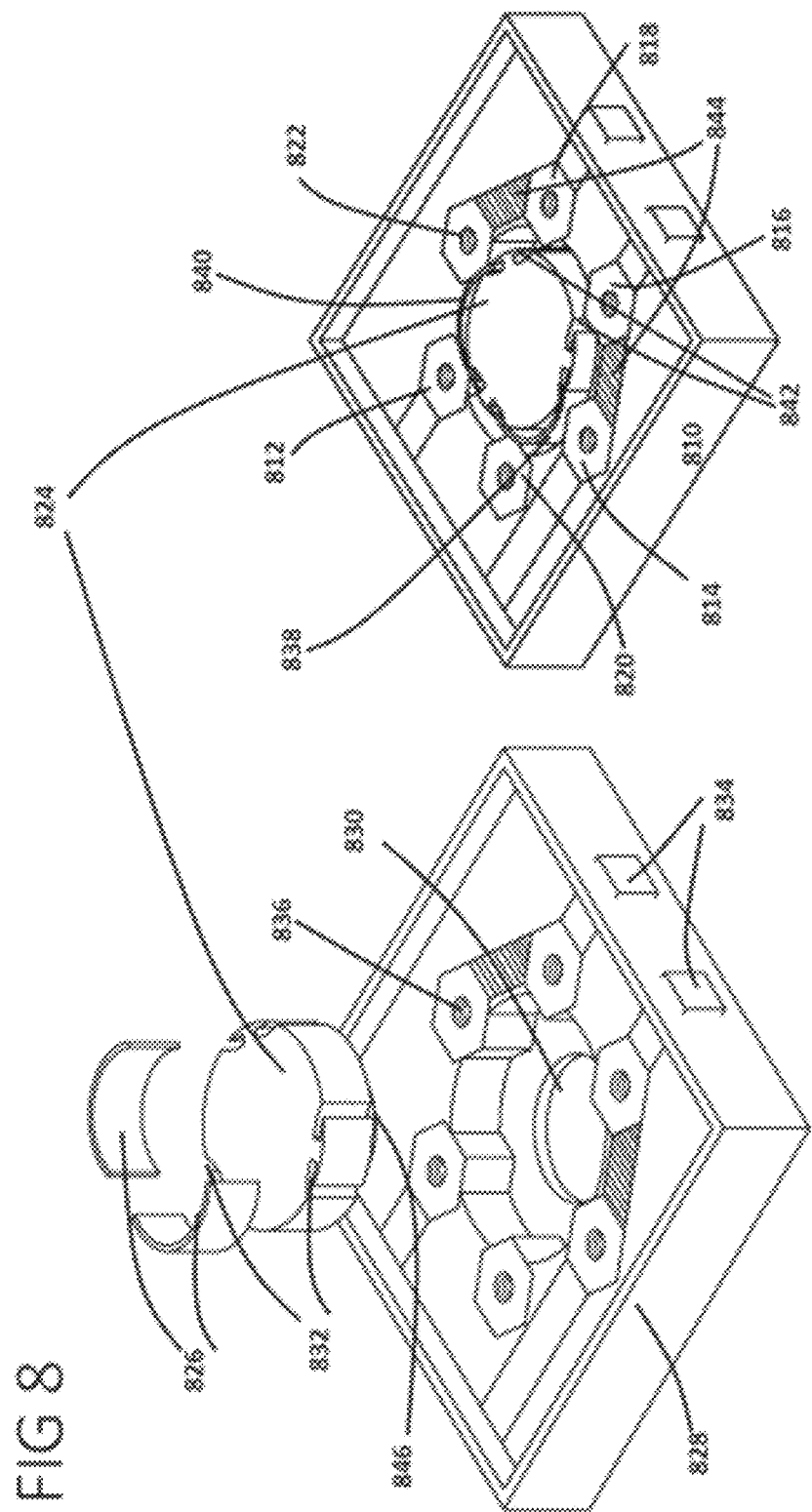
FIG. 8 shows an exploded view of the junction box inside the compact solar module.

FIG. 8 shows the various parts of an illustrative junction box [810] that transfers electrical power from the top solar panel layer to the power connectors which in turn delivers power to the load. The housing of the junction box [828] contains various terminals blocks that connect to the input and output wires. The terminals are made of conductive material such as metal, including in one example, copper. In one embodiment of the junction box the terminals [812] [814] [816] [818] [820] [822] are shown as hexagonal structures with holes in them, perpendicular to the axis of the hexagon, to accommodate wire entry from inlets [834] and be secured with screws inserted in the threaded slots along the axis of the hexagon, shown exemplarily in [836]. Wires with lugs can also be attached on the top of the terminals with screws inserted in threaded slots [836].

Also shown is a rotary dial [824] with special grooves [832] that accommodate arc shaped springs [826] with a rectangular cross-section. These spring connectors can move in and out of the grooves as the spring changes shape. The rotary dial can be turned using a knob [846] that fits an access hole in the bottom of the junction box [830]. In its resting state each conductive spring [838] [840] connects two terminals electrically each. The spring [838] is shown to connect terminal [814] to [820] and spring [840] connects terminal [812] to terminal [822] at one position of the rotary dial. As the rotary dial is turned in clockwise or anticlockwise direction the springs will compress due to the indentation of the hexagonal terminals and break the connection between two terminals it connected previously till it comes to its second resting position between the next set of two terminals that it now electrically connects. The rotary dial can turn indefinitely to connect remaining sets of two terminals within the junction box. The rotary dial can also be restricted to move only between a select few sets of terminal if needed. Some springs can be omitted as shown in empty grooves [842] to achieve a specific functionality of the junction box. Terminals can also be connected to each other using conductive material, such as metal strips, as shown in [844]. With two spring connectors [838] [840] and conductive metal strip [844] connecting terminals [814] to [816] and terminals [818] to [822], the junction box achieves a Double Pole Double Throw (DPDT) functionality. Without the connecting metal strip [844] and additional spring connectors in empty grooves [842] the junction box can achieve a Triple Pole Triple Throw [TPTT] functionality. The number of terminals in the junction box can be increased or decreased and the number of spring connectors along with its respective housing grooves, in the rotary dial can also be increased or decreased to achieve a more complicated functionality.

In more details, FIG. 9, exemplifies one embodiment of the junction box with wires [922] [912] [924][926][928] [914] connected to the terminals [940 ][942][944][946][948] [950] respectively to enable integration of the junction box into the compact solar module. The positive [912] and negative [914] wires from the solar panel layer can be connected to terminals [942] and [950] respectively. With the rotary dial knob [920] in its default position pointing to letter P [952] the spring connectors [916] connects terminals [940] and [942] transferring the positive polarity from the solar panel wire [912] to outbound wire [922]. Since the terminals [942] and terminals [944] are electrically connected with a conducting metal strip [954] the outbound wire [924] also achieves a positive polarity. In the same rotary dial position the spring [918] connects terminals [948] and [950] transferring the negative polarity from the solar wire [914] to the outbound wire [928]. With a conductive metal strip [956] electrically connecting terminals [946] and [948] the negative polarity from the solar wire [914] is also transferred to the outbound wire [926]. So in this configuration the compact solar modules can be connected in parallel electrical configuration to each other. The rotary dial knob [920] is preferably mounted to be accessible from the rear of the panel, that is, through the substrate layer, though in other examples the knob [920] may instead or in addition be accessible on the face of the panel. The dial knob [920] may be designed for manual twisting or may have a slot or slots to receive, for example, a slot head or phillips head screwdriver or any other suitable tool.

In further detail shown in FIG. 9, with the rotary dial knob turned to point to the letter S [934] the spring connector [930] makes a redundant connection to terminals [942] and [944] since they are already connected with the conductive metal strip [954]. At the same time the spring connector [932] now connects terminal [950] with terminal [940], thus connecting the negative solar wire [914] with the outbound wire [936] which now assumes a negative polarity. Since the terminal [942] is connected to incoming positive solar panel wire [912] and the terminal [942] and terminal [944] are electrically connected the outbound wire [938] assumes the positive polarity of the incoming solar panel wire [912]. When the spring connector [932] connects the terminal [950] with terminal [940] it also disconnects the terminals [950] and [948] thus effectively disconnecting the negative solar panel wire [914] and the outbound wire [942]. Since the outbound wires [942] and [940] are electrically connected with metal strip [956] they are both simultaneously electrically isolated from both the solar panel wires and are now considered as pass through wires indicated by the letter P enclosed in a circle. In this configuration the compact solar modules can be connected to each other in a series configuration.

A first illustrative and non-limiting example takes the form of a solar module comprising: a substrate; a honeycomb structure on the substrate; a solar panel on the honeycomb structure, such that the substrate, honeycomb and solar panel form a sandwich having an exterior perimeter; a rotary junction box configured to be manipulated between at least first and second electrical configurations, the rotary junction box disposed between the substrate and the solar panel; a plurality of electrical couplers along the exterior perimeter; and a plurality of electrical connectors connecting the solar panel, the rotary junction box, and the electrical couplers.

Additionally or alternatively to the first illustrative and non-limiting example, the rotary junction box may be accessible through the substrate.

Additionally or alternatively to the first illustrative and non-limiting example, the rotary junction box may be configured to be manipulated through the substrate using a screw or bolt that passes through the substrate.

Additionally or alternatively to the first illustrative and non-limiting example, the rotary junction box may be accessible or manipulatable through the solar panel.

Additionally or alternatively to the first illustrative and non-limiting example, the honeycomb structure may define one or more channels that receive the electrical connectors and have open edges at the exterior perimeter to allow air flow therethrough.

Additionally or alternatively to the first illustrative and non-limiting example, the honeycomb structure may define one or more channels that receive electrical connectors.

Additionally or alternatively to the first illustrative and non-limiting example, the honeycomb structure may define a pocket that receives the rotary junction box.

Additionally or alternatively to the first illustrative and non-limiting example, the honeycomb structure may define a pocket that receives the rotary junction box.

Additionally or alternatively to the first illustrative and non-limiting example, the exterior perimeter may include at least first and second sides and the plurality of couplers includes at least first and second couplers on a first side of the exterior perimeter and third and fourth couplers on a second side of the perimeter further wherein: the solar panel has a positive output and a negative output; when the rotary junction box is in the first configuration, the first and third couplers are connected to the positive output of the solar panel and the second and fourth couplers are connected to the negative output of the solar panel, thereby facilitating parallel connection of the solar module; and when the rotary junction box is in the second configuration, the first coupler is connected to the positive output of the solar panel, the second coupler is connected to the negative output of the solar panel, and the third and fourth couplers are connected to one another but not to the solar panel, thereby facilitating series connection of the solar module.

Additionally or alternatively to the first illustrative and non-limiting example, the rotary junction box may comprise a rotary dial having a plurality of paired grooves, a plurality of springs adapted to be received in selected pairs of the grooves to reside on an outer facing portion of the rotary dial; a housing with a plurality of terminals disposed around a pocket adapted to receive the rotary dial, the terminals and springs being formed of a conductive metal, wherein rotation of the rotary dial brings selected ones of the terminals into electrical connection with one another by action of one of the springs contacting two of the terminals at the same time.

A second illustrative, non-limiting example may comprise a plurality of modules as in the first illustrative and non-limiting example (and any alternatives thereto), wherein the third coupler of a first solar module is connected to the first coupler of a second solar module, and the fourth coupler of the first solar module is connected to the second coupler of the second solar module, such that: when the rotary junction boxes of each of the first and second solar modules are in the respective first configurations, the solar panels of the first and second solar modules are coupled in parallel to one another; and when the rotary junction boxes of each of the first and second solar modules are in the respective second configurations, the solar panels of the first and second solar modules are coupled in series with one another.

A third illustrative and non-limiting example takes the form of a rotary junction box comprising: a rotary dial having a plurality of paired grooves; a plurality of springs adapted to be received in selected pairs of the grooves to reside on an outer facing portion of the rotary dial; a housing with a plurality of terminals disposed around a pocket adapted to receive the rotary dial; wherein the terminals and springs are formed of a conductive metal; and wherein rotation of the rotary dial brings selected ones of the terminals into electrical connection with one another by action of one of the springs contacting two of the terminals at the same time. In an alternative, rather than paired grooves, single grooves, or single or paired holes or posts may be provided to attach to spring contacts about the rotary dial.

A fourth illustrative and non-limiting example takes the form of a solar panel module comprising: a substrate; a solar panel having at least first and second outputs, the solar panel and substrate secured to one another such that the substrate at least partly supports the solar panel; and a rotary junction box as in the third illustrative and non-limiting example disposed on the substrate.

Additionally or alternatively to the fourth illustrative and non-limiting example, the rotary junction box, and the rotary dial thereof, may be configured to be manipulated using a dial on the substrate, with a screw or bolt extending through the substrate to the dial.

Additionally or alternatively the fourth illustrative and non-limiting example may further comprise a honeycomb structure between the substrate and the solar panel such that the substrate and solar panel are secured to one another via the honeycomb structure.

Additionally or alternatively to the fourth illustrative and non-limiting example, the honeycomb structure may comprise a pocket for receiving the rotary junction box.

Additionally or alternatively to the fourth illustrative and non-limiting example, the honeycomb structure may comprise a plurality of channels therethrough and a perimeter, wherein the channels extend to the perimeter to allow air flow through the channels.

Additionally or alternatively the fourth illustrative and non-limiting example may further comprise a plurality of electrical connectors received in the honeycomb channels, the electrical connectors coupling together at least one of the outputs of the solar panel, the rotary junction box, and one or more couplers on the perimeter.

Additionally or alternatively to any of the first to fourth illustrative and non-limiting examples, the channels may be straight.

Additionally or alternatively to any of the first to fourth illustrative and non-limiting examples, the channels may be one of zig-zag or curved.

Additionally or alternatively to any of the first to fourth illustrative and non-limiting examples, the substrate may comprise bracket mounting holes for attaching one or more brackets thereto for mounting, and at least one channel corresponds to at least one bracket mounting hole.

Additionally or alternatively any of the first to fourth illustrative and non-limiting examples may further comprise a mounting accessory attached to the solar module.

Additionally or alternatively to any of the first to fourth illustrative and non-limiting examples, wherein the substrate may comprise a bottom plate which extends beyond the periphery as a flap adapted to be inserted beneath a rooftop shingle.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. In the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A solar module comprising:
   a substrate;
   a honeycomb structure on the substrate;
   a solar panel on the honeycomb structure, such that the substrate, honeycomb and solar panel form a sandwich having an exterior perimeter;
   a rotary junction box configured to be manipulated between at least first and second electrical configurations, the rotary junction box disposed between the substrate and the solar panel, wherein the rotary junction box is accessible through the solar panel;
   a plurality of electrical couplers along the exterior perimeter; and
   a plurality of electrical connectors connecting the solar panel, the rotary junction box, and the electrical couplers.

2. The solar module of claim 1 wherein the honeycomb structure defines one or more channels that receive the electrical connectors and have open edges at the exterior perimeter to allow air flow therethrough, the channels being enclosed on one side by the substrate and on and opposite side by the solar panel.

3. The solar module of claim 1 wherein the honeycomb structure defines one or more channels that receive electrical connectors, the channels being enclosed on one side by the substrate and on and opposite side by the solar panel.

4. The solar module of claim 3 wherein the honeycomb structure defines a pocket that receives the rotary junction box.

5. The solar module of claim 3, wherein the channels are straight.

6. The solar module of claim 3, wherein the channels are one of zig-zag or curved.

7. The solar module of claim 1 wherein the honeycomb structure defines a pocket that receives the rotary junction box.

8. The solar module of claim 1, wherein the substrate comprises bracket mounting holes for attaching one or more brackets thereto for mounting, and at least one channel corresponds to at least one bracket mounting hole.

9. The solar module of claim 1, further comprising a mounting accessory attached to the solar module.

10. The solar module of claim 1, wherein the substrate comprises a bottom plate which extends beyond the exterior perimeter as a flap adapted to be inserted beneath a rooftop shingle.

11. The solar module of claim 1 wherein the exterior perimeter includes at least first and second sides and the plurality of couplers includes at least first and second couplers on a first side of the exterior perimeter and third and fourth couplers on a second side of the perimeter further wherein:
   the solar panel has a positive output and a negative output;
   when the rotary junction box is in the first configuration, the first and third couplers are connected to the positive output of the solar panel and the second and fourth couplers are connected to the negative output of the solar module, thereby facilitating parallel connection of the solar module; and
   when the rotary junction box is in the second configuration, the first coupler is connected to the positive output of the solar panel, the second coupler is connected to the negative output of the solar panel, and the third and fourth couplers are connected to one another but not to the solar panel, thereby facilitating series connection of the solar module.

12. A solar system comprising at least first and second solar modules as in claim 11, wherein the third coupler of the first solar module is connected to the first coupler of the second solar module, and the fourth coupler of the first solar module is connected to the second coupler of the second solar module, such that:
when the rotary junction boxes of each of the first and second solar modules are in the respective first configurations, the solar panels of the first and second solar modules are coupled in parallel to one another; and
when the rotary junction boxes of each of the first and second solar modules are in the respective second configurations, the solar panels of the first and second solar modules are coupled in series with one another.

13. The solar module of claim 1 wherein the rotary junction box comprises a rotary dial having a plurality of paired grooves, a plurality of springs adapted to be received in selected pairs of the grooves to reside on an outer facing portion of the rotary dial; a housing with a plurality of terminals disposed around a pocket adapted to receive the rotary dial, the terminals and springs being formed of a conductive metal, wherein rotation of the rotary dial brings selected ones of the terminals into electrical connection with one another by action of one of the springs contacting two of the terminals at the same time.

14. A solar module comprising:
a substrate;
a honeycomb structure on the substrate;
a solar panel on the honeycomb structure, such that the substrate, honeycomb and solar panel form a sandwich having an exterior perimeter;
a rotary junction box configured to be manipulated between at least first and second electrical configurations, the rotary junction box disposed between the substrate and the solar panel, wherein the rotary junction box is accessible through the substrate;
a plurality of electrical couplers along the exterior perimeter; and
a plurality of electrical connectors connecting the solar panel, the rotary junction box, and the electrical couplers;
wherein the exterior perimeter includes at least first and second sides and the plurality of couplers includes at least first and second couplers on a first side of the exterior perimeter and third and fourth couplers on a second side of the perimeter further wherein:
the solar panel has a positive output and a negative output
when the rotary junction box is in the first configuration, the first and third couplers are connected to the positive output of the solar panel and the second and fourth couplers are connected to the negative output of the solar panel, thereby facilitating parallel connection of the solar module; and
when the rotary junction box is in the second configuration, the first coupler is connected to the positive output of the solar panel, the second coupler is connected to the negative output of the solar panel, and the third and fourth couplers are connected to one another but not to the solar panel, thereby facilitating series connection of the solar module.

15. The solar module of claim 14 wherein the rotary junction box is configured to be manipulated through the substrate using a screw or bolt that passes through the substrate.

16. The solar module of claim 14 wherein the honeycomb structure defines one or more channels that receive electrical connectors and a pocket that receives the rotary junction box, the channels being enclosed on one side by the substrate and on and opposite side by the solar panel.

17. The solar module of claim 14 wherein the rotary junction box comprises a rotary dial having a plurality of paired grooves, a plurality of springs adapted to be received in selected pairs of the grooves to reside on an outer facing portion of the rotary dial; a housing with a plurality of terminals disposed around a pocket adapted to receive the rotary dial, the terminals and springs being formed of a conductive metal, wherein rotation of the rotary dial brings selected ones of the terminals into electrical connection with one another by action of one of the springs contacting two of the terminals at the same time.

* * * * *